(12) United States Patent
Heinrich et al.

(10) Patent No.: US 8,187,402 B2
(45) Date of Patent: May 29, 2012

(54) METHOD FOR PRODUCING A MULTIDIRECTIONAL FABRIC WEB

(75) Inventors: Hans-Juergen Heinrich, Chemnitz (DE); Juergen Foedisch, Chemnitz (DE); Jan Gruenert, Chemnitz (DE)

(73) Assignee: Karl Mayer Malimo Textilmaschinenfabrik GmbH, Chemnitz (DE)

( * ) Notice: Subject to any disclaimer, the term of this patent is extended or adjusted under 35 U.S.C. 154(b) by 750 days.

(21) Appl. No.: 12/281,593

(22) PCT Filed: Mar. 4, 2006

(86) PCT No.: PCT/EP2006/002002
§ 371 (c)(1),
(2), (4) Date: Sep. 3, 2008

(87) PCT Pub. No.: WO2007/098786
PCT Pub. Date: Sep. 7, 2007

(65) Prior Publication Data
US 2009/0056857 A1     Mar. 5, 2009

(51) Int. Cl.
*B29C 53/56* (2006.01)
(52) U.S. Cl. .................... 156/169; 156/204
(58) Field of Classification Search .............. 156/148, 156/166, 181, 204, 162, 169; 19/296, 299
See application file for complete search history.

(56) References Cited

U.S. PATENT DOCUMENTS

| | | | |
|---|---|---|---|
| 3,122,115 A * | 2/1964 | Siegwart | 72/50 |
| 3,459,615 A | 8/1969 | Eilerman | |
| 2004/0082244 A1* | 4/2004 | Loubinoux | 442/181 |
| 2006/0188691 A1* | 8/2006 | Kawabe et al. | 428/105 |

FOREIGN PATENT DOCUMENTS

| | | |
|---|---|---|
| DE | 0768167 A2 * | 10/1995 |
| DE | 10 2005 000115 | 3/2006 |
| EP | 0 768 167 | 4/1997 |
| FR | 1 453 289 | 6/1966 |
| FR | 2 058 440 | 5/1971 |
| JP | 2003 221771 | 8/2003 |

* cited by examiner

*Primary Examiner* — Katarzyna Wyrozebski Lee
*Assistant Examiner* — Scott W Dodds
(74) *Attorney, Agent, or Firm* — Greenblum & Bernstein, P.L.C.

(57) ABSTRACT

The invention relates to a method for the continuous production of a multidirectional fabric web. The object of the invention is to create a method for the continuous production of a multidirectional fabric web that has a material layer running in a longitudinal direction and thus has sufficient stability against distortions in the fabric. This object is achieved according to the invention in that a continuous fold-winding process of at least one fiber layer running at an angle to the direction of extension of the fabric web to be produced takes place with the enclosing of at least one material web (1) running freely in the spread-out state in the production direction at least in the fold-winding zone. The invention can be used in the production of fabric webs that are used for example as a reinforcement of high-strength plastics.

15 Claims, 4 Drawing Sheets

METHOD FOR PRODUCING A MULTIDIRECTIONAL FABRIC WEB

CROSS-REFERENCE TO RELATED APPLICATIONS

The present application is a U.S. National Stage of International Patent Application No. PCT/EP2006/002002 filed Mar. 4, 2006, and claims priority of German Patent Application Nos. 10 2005 000 115 filed Sep. 13, 2005 and 10 2004 044 883.3 filed Sep. 14, 2004. Moreover, the disclosure of International Patent Application No. PCT/EP2006/002002 is expressly incorporated by reference herein in its entirety.

BACKGROUND OF THE INVENTION

1. Field of the Invention

The invention relates to a method for the continuous production of a multidirectional fabric web.

2. Discussion of Background Information

Bidirectional and multidirectional fabric constructions as well as methods for their production are known. Such fabrics are used, among other things, as textile reinforcing structures in bonded fiber applications, primarily with a layer structure of ±45°. However, for many applications, the bidirectional or multidirectional reinforcement in the ±α direction is not sufficient. Here at least one further layer with 0° orientation is needed. This additional material layer is required in order to be able also to absorb forces in the 0° direction in addition to the loads in the ±α direction in the later bonded fiber component.

In EP 768167 a method is described with which a fabric is produced that is biaxially reinforced preferably in the ±45° direction. A unidirectional fiberwoven fabric that has been preset by an adhesive thread grid and that is winding onto a revolving work plate at the folding angle ±α to the production direction of the biaxial fabric, is thereby converted into a two-layer fabric web in a fold-winding process. The two-layer fabric web is drawn off from the revolving work plate by a transport device and is bonded by a pair of pressure rolls.

During the drawing-off and spreading-out of the biaxial fiber layers from the revolving work plate which are pre-set only by the mesh-like structure of the applied adhesive threads, distortion of the laid-down fiber layers occurs. Without the presence of a stabilizing support layer in the form of a transport aid in the production direction, which absorbs in the biaxial fabric construction the stresses in the fabric occurring during the drawing-off, spreading-out and transporting of the fabric, a distortion-free setting with the strived—for high surface quality over the entire fabric width of the fiber layers laid down in the ±α orientation, is possible only with great difficulty.

In EP 768167 moreover the possibility is mentioned of calender-coating the needed 0° layer and/or additional material layers onto the finished ±α fabric in a further additional step separate from the fabric-forming process. However, this does not eliminate the above-mentioned problems. Also, it is no longer possible in this manner to fulfill the requirement for a 0° layer arranged between the two angle layers.

JP 2003-221771 describes a device for the production of biaxial fabrics. Likewise in a fold-winding process, one or more material webs fed laterally at an angle of ±α to the production direction of the biaxial fabric are wound onto interior stationary edge elements that are arranged in pairs at a distance from one another. On the edge elements, double-sided adhesive tapes to fix the two layers on top of one another are brought into the interior of the fabric tube. The fabric tube is drawn off from the interior edge elements, spread out, and bonded by a pair of pressure rolls.

A disadvantage of this is the insertion of the double-sided adhesive tapes into the edge areas of the fabric, which lead to a varying thickness in the fabric. As a result, the thickened edges must either be removed in an additional operation or be accepted as a quality defect. Moreover the edge areas of the fabric are formed by the edge elements at a considerable distance, since between the edge elements, the covering tapes to be drawn off from the double-sided adhesive tapes must be guided back out of the folding zone. Distortions in the fabric are generated thereby during the drawing-off of the fabric tube. Also, the introduction of a stabilizing inner 0° layer is not possible with this device, so that the resulting fabric web has no distortion stability in the production direction.

SUMMARY OF THE INVENTION

The present invention provides a method for the continuous production of a multidirectional fabric web that has a material layer running in the longitudinal direction and thus has sufficient stability against distortions in the fabric.

Accordingly, the invention is directed to a method for the continuous production of a multidirectional fabric web using at least one fabric layer having a spread-out flat fiber structure. This at least one fiber layer runs at an angle to the direction of extension of the fabric web to be produced, and is converted in a continuous fold-winding process into a multi-layer, multidirectional fabric. The fold-winding process takes place while enclosing at least one material web running freely in the production direction in the spread-out state in the fold-winding zone.

The method according to the invention for the production of multidirectional fabric is a continuous fold-winding process in which one or more fiber layers from a spread-out flat fiber structure, which fiber layers are oriented at a folding angle of ±α, are wound around at least one second material web oriented in the production direction (the 0° direction).

The fiber layers are delivered or drawn off continuously from feed rolls, folded to produce a multidirectional fabric, wound and laid down, set, and optionally fed to further processing steps. The winding takes place around the edges of the freely running material web spread out flat in the 0° orientation, without additional elements such as a winding table or edge guides being present. In the known art, these additional elements are stabilizing, and are arranged in the interior of the fabric tube being formed, or to absorb loads that occur during the fold-winding process and affect the material web.

The wrapping of the web edges of the material web oriented in the 0° direction with the fiber layer(s) fed at the folding angle ±α can take place easily directly around the edges of the 0° material web, provided that there are suitable feed materials.

However, the invention also provides—and this will be necessary with most material webs—that the fiber layers be folded during the fold-winding process before being placed on the respective edge of the material web, to be precise, at the point that comes to lie at the web edge immediately thereafter.

In the multidirectional fabric to be produced, a great variety of layer constructions and structures can be realized through the fabric-forming process according to the invention. Thus the fabric as a reinforcing textile can be coordinated very well with the later component requirements.

Through the combination of a great variety of types of fiber or material, as well as setting and binding systems, various weights per unit area, fabric constructions and surface structures can be realized. For example, multidirectional fabrics of low weight per unit area with a homogeneous, split-free surface for components with high optical surface quality requirements are possible.

Feed materials for the material web running in the 0° direction can be both loose or bound as a textile fabric (e.g. woven fabrics, fabrics, knit fabrics, nonwovens, etc.), unidirectionally or multidirectionally arranged individual fibers, rovings, filaments, or fiber layers as well as material webs (e.g. spacer structures).

For the fiber layers, suitable fibrous starting materials are all reinforcing fibers for plastics (e.g. glass fibers, carbon fibers, and aramid fibers) as well as natural fibers (e.g. flax, jute, sisal) and synthetic fibers (e.g. polypropylene, polyester, polyethylene). The individual fiber layer can thereby comprise homogeneous fiber material or mixed fibrous materials (e.g. hybrid yarns), unfixed or can be fixed by various bonding systems (e.g. sewing threads, melt adhesives or permanent adhesives). Moreover the fiber layers can again comprise multidirectional fabrics or pre-fixed textile fabrics (e.g. woven fabrics, knit fabrics, nonwovens, etc.).

Furthermore hybrid- and multilayer constructions (e.g. honeycomb structures) can be produced continuously with the described fabric-forming method.

The bonding of the fabric construction to produce a manageable, i.e. non-slip bonded multidirectional fabric can take place by bonding systems (e.g. permanent adhesives) introduced separately during the winding process or by binding systems already introduced into the prefabricated feed material under pressure or under heat and pressure. Other types of bonding, e.g. mechanical, are also possible.

According to embodiments, the invention is directed to a method for the continuous production of a fabric web. The method includes feeding at least one fabric layer having a spread-out flat fiber structure at an angle to a production direction, and converting the at least one fabric layer to a multilayer, multidirectional fabric in a continuous fold-winding process that encloses at least one material web running freely in the production direction.

According to embodiments, the at least one material web can be running in a spread-out state.

Further, the continuous fold-winding process can include rotating the material web around its longitudinal axis, while a supply of the at least one fiber layer may be oriented at an angle $\alpha$ to the longitudinal axis of the material web.

Still further, the continuous fold-winding process may include the at least one fiber layer revolving around the spread-out flat free-running material web.

In accordance with features of embodiments, the continuous fold-winding process can include the at least one fiber layer being folded as it is placed on taut edges of the material web.

According to other features of the embodiments, the continuous fold-winding process may include the at least one fiber layer being folded before being placed on the respective edge of the material web.

Moreover, the material of the material web may be selected from bonded textiles such as woven fabrics, fabrics, knit fabrics, nonwovens, unidirectionally or multidirectionally arranged individual fibers, rovings, filaments, or fiber layers.

According to further features, the at least one material web may contain a spacer structure such as a spacer knit fabric or a honeycomb structure.

In accordance with embodiments, the at least one fiber layer may include at least one of reinforcing fibers for plastics, natural fibers, and synthetic fibers. In this regard, the reinforcing fibers for plastics can include at least one of glass fibers, carbon fibers, and aramid fibers; the natural fibers can include at least one of flax, jute, and sisal; and the synthetic fibers can include at least one of polypropylene, polyester, and polyethylene.

According to embodiments, the at least one fiber layer may include a homogeneous fiber material or mixed fibers. The mixed fibers can include hybrid yarns, non-set layers, layers fixed by bonding systems such as sewing threads, melt adhesives, permanent adhesives, multidirectional fabrics, and pre-set textile fabrics. The layer fixed by bonding systems may include sewing threads, and the pre-set textile fabrics comprise woven fabrics, knit fabrics, and nonwovens.

Further, the material web and the at least one fiber layer can have facing surfaces structured and arranged to be adhered to one another.

In accordance with embodiments, the at least one fiber layer may have an adherable surface arranged to face the material web.

The method can further include applying an adhesive onto at least one of the surfaces of the material web and the at least one fiber layer immediately before the fold-winding process.

Embodiments of the invention are directed to a method for the continuous production of a multidirectional fabric web using at least one fabric layer having a spread-out flat fiber structure. The method includes enclosing, in a continuous fold-winding process, at least one material web running freely in the production direction in the spread-out state with the at least one fiber layer, which is running at an angle to the direction of extension of the fabric web to be produced.

In accordance with embodiments, the enclosing of the material web may include rotating the material web around its longitudinal axis, while a supply of the at least one fiber layer may oriented at an angle $\alpha$ to the longitudinal axis of the material web.

In accordance with still yet further embodiments, the enclosing of the material web can include the at least one fiber layer revolving around the spread-out flat free-running material web.

BRIEF DESCRIPTION OF THE DRAWINGS

The invention is described in more detail below based on an exemplary embodiment. The associated drawings show in FIG. 1 a diagrammatic top view of a device according to the invention, in which a 0° material web is wrapped with two fiber layers spread out flat.

DETAILED DESCRIPTION OF THE PRESENT INVENTION

Figure 1:
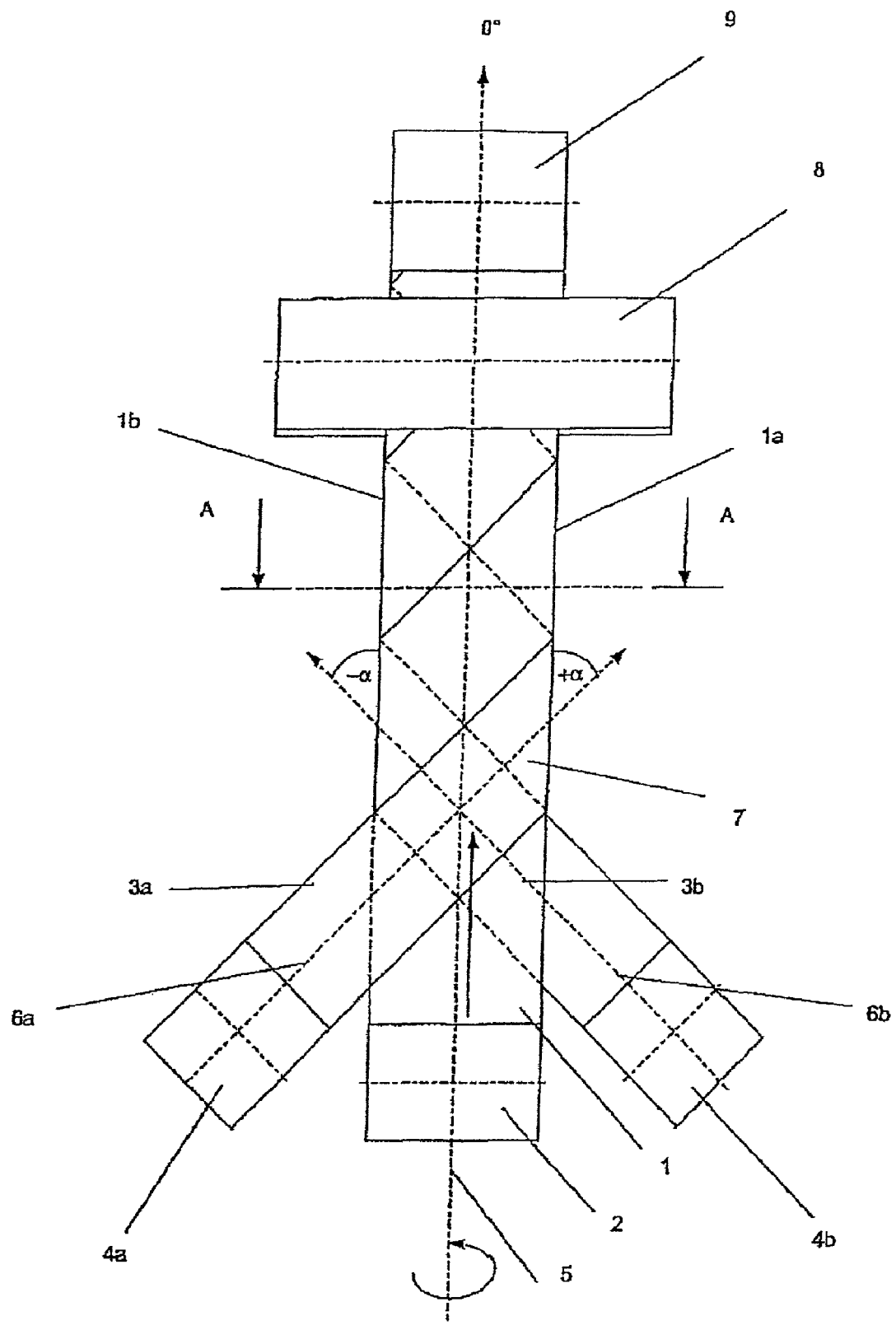

FIG. 1 basically shows the method according to the invention. The material layer 1 is drawn off or delivered from the feed roll 2. The feed roll 2 is arranged in a winding-off station, not shown in more detail. The material web 1 extends between the feed roll 2 and the finish roll 9 arranged in a winding-up station likewise not shown in more detail at an angle of 0° to the production axis or longitudinal axis of the fabric web to be produced and is therefore also designated as 0° material web 1 below.

According to the invention, the material web 1 extends between feed roll 2 and finish roll 9, but at least in the fold-winding zone, in a spread-out flat state and free-running, i.e., without additional holding elements or support elements such as e.g., a winding table.

At the folding angles $+\alpha$ or $-\alpha$, fiber layers 3a and 3b comprising a spread-out flat fiber structure are fed laterally from the feed rolls 4a and 4b along the web running axes 6a; b.

The fold-winding process takes place in that the fed fiber layers 3a; b are wound over the edges 1a; b of the material web 1 in a split-free and distortion-free manner by a relative rotary movement of the material web 1 around the web running axis 5 with respect to the feed rolls 4a; b of the fiber layers 3a; b and are thereby folded around the edges 1a; b of the material web 1.

This relative rotary movement between the stated elements can on the one hand be achieved through a rotation of the feed roll 2 and the finish roll 9 synchronous to one another around the web running axis 5. However, a rotation of the feed rolls 4a; b around the material web 1 around the web running axis 5 is also possible. A superimposition of both movements is also conceivable.

In the exemplary embodiment the former case is shown. To this end, the feed roll 2 and the finish roll 9 are arranged in the winding-off station or winding-up station such that they can rotate around the web running axis 5. The feed rolls 4a; b of the fiber layers 3a; b are arranged laterally to the web running axis 5 in $\alpha$-orientation to the production direction.

Through the wrapping of the material web 1 with the fiber layers 3a; b, a multidirectional fabric 7 with the layer construction $+/-\alpha$, $0°$, $-/+\alpha$ is formed. The material web 1 is thereby moved between feed roll 2 and finish roll 9 at a speed that corresponds to the offset of the fiber layers 3a; b at the points of intersection with the opposite edges 1a; b of the material web 1. The transport movement in the direction of the web running axis 5 conveys the fabric to the fixing 8, where it is bonded. It is then wound up onto the finish roll 9 or fed to further processing steps (e.g. cutting, stacking, or storage).

The method according to the invention provides that, in the fold-winding process, the fiber layers 3a; b are placed directly onto the spread-out flat free-running material web 1. With appropriate stability of the material web 1, in particular its edges 1a; b, the fiber layers 3a; b can be folded directly in contact with the edges 1a; b.

If this sufficient stability is not provided, then the folding of the fiber layers 3a; b takes place in that they are already folded before being laid against the respective edge 1a; b, to be precise in such a way that the section forming between two folds corresponds at least to the width of the material web 1.

Figure 2:
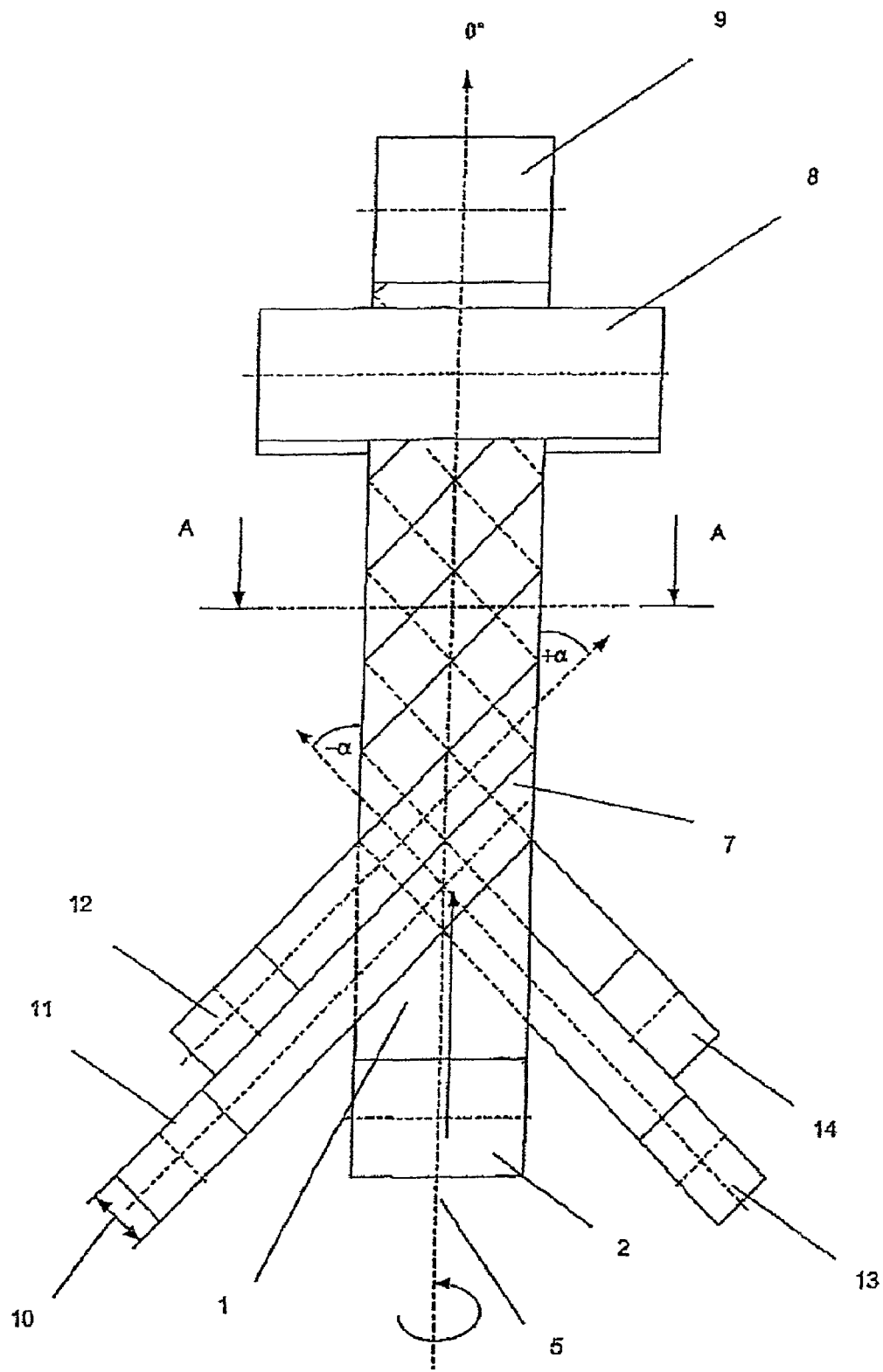
FIG. 2 a representation analogous to FIG. 1, wherein however each fiber layer is composed of two fiber layers running parallel to one another.

FIG. 2 shows a further advantageous variant of the method. To minimize the geometric dimension 10 of the feed roll of the fiber layers fed at the folding angle $\alpha$, it is provided to feed several feed rolls 11, 12, 13, and 14 unilaterally or bilaterally. These feed rolls 11, 12, 13, and 14 are arranged such that the fiber layers 3a; b running off them are laid down edge to edge immediately adjacent.

Figure 3:
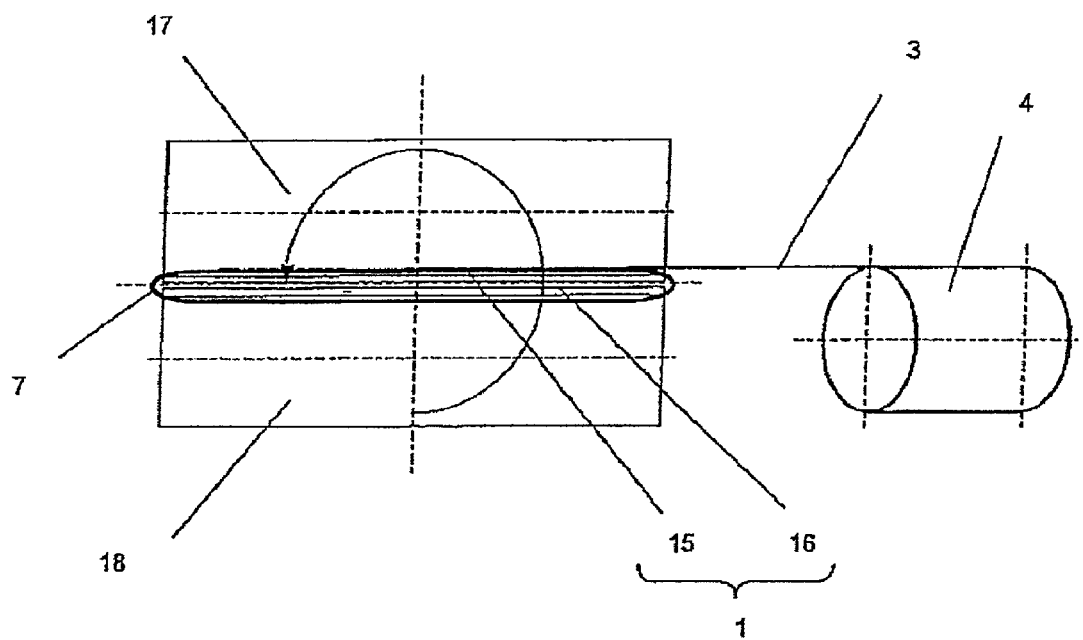
FIG. 3 a cross-section corresponding to line of cut A-A in FIG. 1 or FIG. 2.

FIG. 3 illustrates the construction of the fabric being formed. The material web 1 can be single-layer, but for example can also be constructed from several different material layers 15 and 16, which are pulled off or delivered by the feed rolls 17 and 18 in the direction of the web running axis 5.

Figure 4:
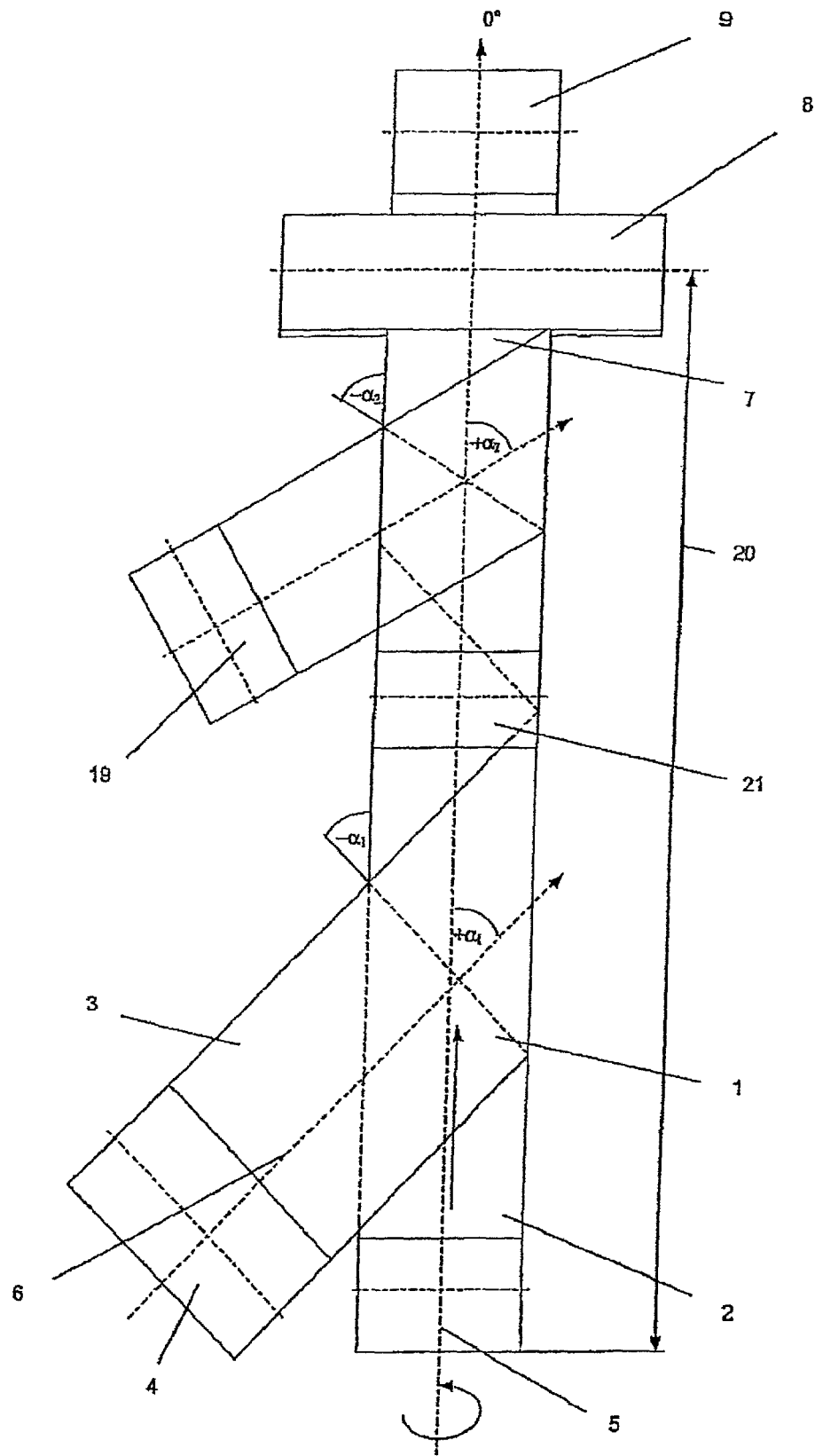
FIG. 4 a representation analogous to FIG. 1, wherein two fiber layers are wrapped onto the 0° material web at different folding angles.

In FIG. 4 the arrangement of a further lateral material feed additionally to a first fiber layer 3 is shown. By feeding one or more additional fiber layers 19, multidirectional fabrics 7 can be produced in a higher number of layers with a great variety of folding angles $\alpha_1$ and $\alpha_2$ as complex fabric structures. By lengthening the feed path 20, it is likewise possible to integrate further $0°$ material webs 21 into the fabric-forming process.

Devices for applying adhesives for bonding material web 1 and fiber layers 3a; b; 19 together are not shown. These can be arranged both after the winding-off station for the feed roll 2 of the material web 1 and in the web travel of the fiber layers 3a; b; 19.

LIST OF REFERENCE NUMBERS USED

1 Material web
1a; b Material web edge
2 Feed roll
3a; b Fiber layer
4a; b Feed roll
5 Web running axis
6 Web running axis
7 Fabric
8 Setting
9 Finish roll
10 Dimension
11 Feed roll
12 Feed roll
13 Feed roll
14 Feed roll
15 Material layer
16 Material layer
17 Feed roll
18 Feed roll
19 Fiber layer
20 Feed path
21 Material web
$\alpha$ Folding angle
$\alpha_1$ Folding angle
$\alpha_2$ Folding angle

The invention claimed is:

1. A method for the continuous production of a fabric web, comprising:
   feeding at least one fabric layer having a spread-out flat fiber structure at an angle to a production direction; and
   converting the at least one fabric layer to a multilayer, multidirectional fabric in a continuous fold-winding process that encloses at least one material web running freely in the production direction,
   wherein the continuous fold-winding process includes the at least one fiber layer being folded before being placed on the respective edge of the material web.

2. The method in accordance with claim 1, wherein the at least one material web is running in a spread-out state.

3. The method in accordance with claim 1, wherein the continuous fold-winding process comprises rotating the material web around its longitudinal axis, while a supply of the at least one fiber layer is oriented at an angle $\alpha$ to the longitudinal axis of the material web.

4. The method in accordance with claim 1, wherein the continuous fold-winding process comprises the at least one fiber layer revolving around the spread-out flat free-running material web.

5. The method in accordance with claim 1, wherein the continuous fold-winding process includes the at least one fiber layer being folded as it is placed on taut edges of the material web.

6. The method in accordance with claim 1, wherein the material of the material web is selected from bonded textiles such as woven fabrics, fabrics, knit fabrics, nonwovens, unidirectionally or multidirectionally arranged individual fibers, rovings, filaments, or fiber layers.

7. The method in accordance with claim 1, wherein the at least one material web contains a spacer structure such as a spacer knit fabric or a honeycomb structure.

8. The method in accordance with claim 1, wherein the at least one fiber layer comprises at least one of reinforcing fibers for plastics, natural fibers, and synthetic fibers.

9. The method in accordance with claim 8, wherein the reinforcing fibers for plastics comprise at least one of glass fibers, carbon fibers, and aramid fibers; the natural fibers comprise at least one of flax, jute, and sisal; and the synthetic fibers comprise at least one of polypropylene, polyester, and polyethylene.

10. The method in accordance with claim 1, wherein the at least one fiber layer comprises a homogeneous fiber material or mixed fibers.

11. The method in accordance with claim 10, wherein the mixed fibers comprise at least one of hybrid yarns, non-set layers, layers fixed by bonding systems such as sewing threads, melt adhesives, permanent adhesives, multidirectional fabrics, and pre-set textile fabrics.

12. The method in accordance with claim 11, wherein the layer fixed by bonding systems comprise sewing threads, and the pre-set textile fabrics comprise at least one of woven fabrics, knit fabrics, and nonwovens.

13. The method in accordance with claim 1, wherein the material web and the at least one fiber layer have facing surfaces structured and arranged to be adhered to one another.

14. The method in accordance with claim 1, wherein the at least one fiber layer has an adherable surface arranged to face the material web.

15. The method in accordance with claim 1, further comprising applying an adhesive onto at least one of the surfaces of the material web and the at least one fiber layer immediately before the fold-winding process.

* * * * *